United States Patent
Lanz et al.

(10) Patent No.: US 7,954,319 B2
(45) Date of Patent: Jun. 7, 2011

(54) METHOD AND CONTROL UNIT FOR SETTING A TURBINE FLOW CROSS-SECTION

(75) Inventors: Hans-Werner Lanz, Vaihingen/Enz (DE); Bjoern Mueller, Altenstadt (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 1055 days.

(21) Appl. No.: 11/713,049

(22) Filed: Mar. 2, 2007

(65) Prior Publication Data

US 2007/0204618 A1 Sep. 6, 2007

(30) Foreign Application Priority Data

Mar. 3, 2006 (DE) .................. 10 2006 009 864

(51) Int. Cl.
*F02D 23/00* (2006.01)
*F02B 37/24* (2006.01)

(52) U.S. Cl. ............................ 60/602; 60/600
(58) Field of Classification Search ............ 60/600–603; F02B 37/24; F02D 23/00
See application file for complete search history.

(56) References Cited

U.S. PATENT DOCUMENTS

| | | | | |
|---|---|---|---|---|
| 4,612,770 A * | 9/1986 | Tadokoro et al. | ............... | 60/602 |
| 5,174,119 A | 12/1992 | Hanauer et al. | .................. | 60/602 |
| 5,187,935 A * | 2/1993 | Akiyama et al. | ................ | 60/602 |
| 6,058,707 A | 5/2000 | Bischoff | ........................ | 60/602 |
| 6,425,246 B1 * | 7/2002 | Schmid | ........................... | 60/602 |
| 6,425,247 B1 * | 7/2002 | Schmid | ........................... | 60/602 |
| 6,725,660 B2 * | 4/2004 | Hidaka | ............................ | 60/602 |
| 7,614,230 B2 * | 11/2009 | Sterner et al. | ................... | 60/602 |
| 2004/0122583 A1 | 6/2004 | Plote et al. | ..................... | 701/108 |
| 2006/0041369 A1 * | 2/2006 | Berglund et al. | ............. | 701/101 |
| 2007/0251233 A1 * | 11/2007 | Bardoll et al. | .................. | 60/602 |
| 2010/0095915 A1 * | 4/2010 | Evans-Beauchamp | ......... | 123/68 |

FOREIGN PATENT DOCUMENTS

| | | |
|---|---|---|
| DE | 40 25 901 C1 | 1/1992 |
| DE | 198 21 902 A1 | 11/1999 |
| DE | 101 10 340 A1 | 9/2002 |
| EP | 0 870 915 A1 | 10/1998 |
| JP | 58176417 A * | 10/1983 |
| JP | 60-22032 | 2/1985 |

OTHER PUBLICATIONS

A Fully Certified English Translation DE 19821902 A1 published on Oct. 18, 1999.*
European Search Report dated Jun. 14, 2007 (three (3) pages).

* cited by examiner

*Primary Examiner* — Thai Ba Trieu

(57) ABSTRACT

A turbine flow cross-section of a turbocharger of an internal combustion engine, is set such that a lower limit (TSQ_dyn_min) of a range of settable values of the turbine flow cross-section is determined as a function of an operating parameter of the internal combustion engine in non-stationary operating states. A speed of the internal combustion engine can be used as the operating parameter.

10 Claims, 3 Drawing Sheets

METHOD AND CONTROL UNIT FOR SETTING A TURBINE FLOW CROSS-SECTION

RELATED APPLICATIONS

This application claims priority to German Patent Application No. 102006009864.1-13, filed Mar. 3, 2006, the disclosure of which is incorporated herein by reference.

BACKGROUND AND SUMMARY OF THE INVENTION

The present invention relates to a method and a control unit for setting an internal combustion engine turbocharger turbine flow cross-section. DE 198 21 902 A1 describes a boost pressure regulator for an exhaust gas turbocharger having variable turbine geometry (VTG) in an internal combustion engine. Diesel engines and split injection and direct injection gasoline engines are cited as examples of internal combustion engines. Furthermore, the boost pressure regulator, which is typically implemented as a PI regulator, must be limited in order to avoid continuous integration of the regulator when stationary precision is not achieved. The adjustment range of the regulator is greater than the setting bandwidth of the boost pressure, so that the boost pressure no longer reacts to manipulated variable changes at the boundaries of the adjustment range of the regulator. Dynamic limiters controlled by ignition maps are known as a remedy, but these are complex and do not always result in optimum results. Input variables of such a limiter controlled by ignition maps are not specified. An undesired boost pressure overshoot in the event of a load jump is particularly disadvantageous.

In order to avoid such boost pressure overshoots in non-stationary operating states without impairing the regulating behavior in stationary operating states, said DE 198 21 902 also suggests that the regulating range be limited in non-stationary operating states as a function of a filtered reference variable of the boost pressure regulator, preferably one which characterizes the load. An injected fuel quantity of a diesel engine is cited as an example of such a reference variable.

Avoiding boost pressure overshooting in the event of a sudden rise of a load of the internal combustion engine represents one optimization criterion among other possible optimization criteria. Under specific conditions, it may be just as important or even more important to allow the most rapid possible torque build-up in the event of a positive load change. A positive load change is understood as any load change having an increase of the load, with the load largely correlating with the torque generated by the internal combustion engine.

Reducing overshooting by limiting the regulator manipulated variable may also result in the undesired increase in the delay with which the actual value of the torque follows a change of its setpoint value in a non-stationary operating state. Such a delay in an internal combustion engine of a motor vehicle is disturbing to the drivability and the subjective driver impression which the motor vehicle provides.

An object of the present invention is to provide a method and a control unit, by which the most rapid possible torque build-up may be achieved in a non-stationary operating state having increased torque demand.

This object has been achieved in a method and a control unit by using the speed of the internal combustion engine as the operating parameter as a function of which a range of settable values of a turbine flow cross-section are determined.

In principle, it is surprising that the demand for the most rapid possible boost pressure build-up is at all compatible with limiting the turbine flow cross-section at the bottom, i.e., with determining a lower limit of a range of settable values of the turbine flow cross-section as a function of an operating parameter. Rather, one would ordinarily expect that the boost pressure would build up most rapidly precisely when the largest possible part of the exhaust gas energy is transmitted to a turbine wheel of the turbocharger, which is more the case at a smaller turbine flow cross-section than at a larger turbine flow cross-section.

At predefined exhaust gas mass flow, the value of the transmitted energy increases with rising pressure gradient over the turbine. Because the pressure of the exhaust gases is essentially constant after flowing through the turbine and is only slightly higher than the ambient pressure, the pressure gradient is a function above all of the damming effect of the turbine, which effect is maximal at minimal turbine flow cross-section.

The exhaust gas counterpressure which results in the combustion chambers of the internal combustion engine with opened exhaust valves, however, also rises with the damming effect. Because inlet valve and exhaust valve of a combustion chamber are opened jointly during the valve overlap, the increased exhaust gas counterpressure obstructs the inflow of air or fuel/air mixture with open inlet valve. Therefore, the charge of the combustion chambers with combustible mixture and thus the torque development are unfavorably influenced by a high exhaust gas counterpressure.

In addition, the exhaust gas quantity and heat energy flowing to the turbine drops when the quantity of the exhaust gas returned into the combustion chambers rises. Even if a maximum energy component is transmitted to the turbine wheel, viewed relatively, the absolute value of the transmitted energy is not optimum under certain circumstances, resulting in a delayed build-up of the charge pressure.

The inventors have recognized that this delay is not solely a function of the value of the exhaust gas counterpressure, but rather the delay is correlated more with another engine parameter. This engine parameter, in which optimum and suboptimum torque and boost pressure curves differ, is the scavenging gradient. This term refers to the difference $p_2-p_3$ of the pressure $p_2$ in the direction of the gas flow before the inlet valve and the pressure $p_3$ after the exhaust valve.

The scavenging gradient is negative in the most unfavorable case. In other words; the pressure $p_3$ is greater than the pressure $p_2$. In principle, the scavenging gradient may be measured or modeled from a larger or smaller number of operating parameters of the internal combustion engine. It has been shown, however, that the value of the scavenging gradient at which an optimally rapid boost pressure and torque increase results varies only slightly and may be described as a function of a few parameters.

The scavenging gradient is itself strongly dependent on the turbine flow cross-section in the exhaust gas mass flow, however, and this is in turn correlated with the speed. Viewed qualitatively, the scavenging gradient rises with increasing speed and falls with growing turbine flow cross-section. Therefore, for a specific speed, there are turbine flow cross-sections at which a critical scavenging gradient does not yet occur, and other, smaller flow cross-sections at which a critical scavenging gradient already occurs.

Speed is an operating parameter which is detected and analyzed in any case in modern internal combustion engines. The use of speed as an operating parameter for determining the lower limit of a range of settable values of the turbine flow cross-section therefore allows optimum setting of the turbine flow cross-section in regard to the most rapid possible boost pressure and torque increase in a non-stationary operating state without additional sensors. This is true independently of whether the present invention is viewed in its method aspects or in an implementation in the form of a control unit set up by appropriate programming.

BRIEF DESCRIPTION OF THE DRAWINGS

An embodiment of the present invention is described in greater detail on the basis of the drawings, in which.

DETAILED DESCRIPTION OF THE DRAWINGS

Figure 1:
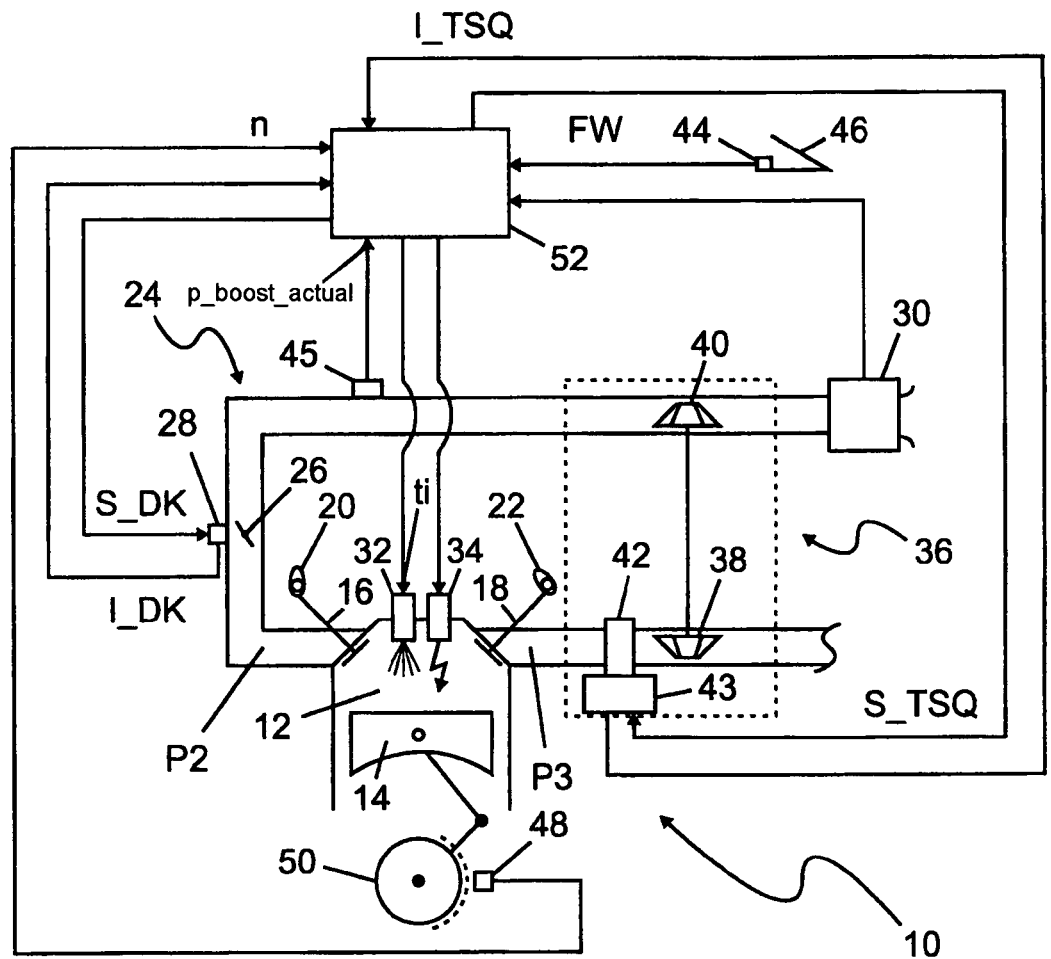
FIG. 1 is a schematic diagram showing an internal combustion engine having a turbocharger with variable turbine geometry.

Specifically, FIG. 1 shows an internal combustion engine 10 having at least one combustion chamber 12, that is movably sealed by a piston 14. A change of charges of the combustion chamber 12 is controlled via an inlet valve 16 and an exhaust valve 18. The inlet valve 16 is actuated by an inlet valve control element 20 and the exhaust valve 18 is actuated by an exhaust valve control element 22. The inlet valve control element 20 controls the inlet valve 16 in one embodiment using a variable stroke and is thus used as a charge actuator.

When inlet valve 16 is open, air or a mixture of air and fuel flows from an intake system 24 into the combustion chamber 12. The quantity of the inflowing air or the inflowing mixture is set via a throttle valve 26, that is actuated by a throttle valve control element 28, as an alternative or supplement to a variation of the stroke of the inlet valve 16. In any case, the combustion chamber charge is decisively influenced by the pressure p2 before the inlet valve 16. The throttle valve control element 28 has in one embodiment an integrated throttle valve sensor that provides information I_DK about an actual value of the opening angle of the throttle valve 26.

The combustion chamber charge is preferably determined from the signal of a charge sensor 30, that may be implemented as an air-mass meter or intake manifold pressure sensor. The charge may thus be determined as an air mass intake ml scaled to speed and cylinder count. It is now readily apparent to one skilled in the art in light of the disclosure herein that an intake manifold pressure sensor may also be provided as a supplement to an air-mass meter. The fuel is either metered into the intake system 24 (intake manifold injection) or injected by an injector 32 directly into the combustion chamber 12 (direct injection).

In any case, a combustible combustion chamber charge is produced in the combustion chamber 12. The internal combustion engine 10 is preferably a gasoline engine, in which the combustion chamber charge is ignited by a spark plug 34. In a diesel engine, the spark plug may be dispensed with. Residual gases of the combusted charge of the combustion chamber 12 are expelled via the open exhaust valve 18.

The internal combustion engine 10 illustrated in FIG. 1 has an exhaust gas turbocharger 36, whose turbine wheel 38 is driven by the expelled exhaust gases and in turn drives a compressor wheel 40 in the intake system 24. The exhaust gas turbocharger 36 has an actuator 42 having an electrical drive 43 for controlling the geometry of the turbocharger 36. The electrical drive 43 is typically an electric motor that generates a linear or curved positioning movement in connection with the mechanism of the actuator 42. The boost pressure p_boost_act generated by the turbocharger 36 is detected by a boost pressure sensor 45.

Torque demands of a driver are detected by a driver command meter 44 that detects the position of an accelerator pedal 46 of the motor vehicle as the driver command FW. A rotational angle sensor 48 scans angle markings of an encoder wheel 50 connected rotationally fixed to a crankshaft of the internal combustion engine 10 and thus provides information about the angular position and angular velocity of the crankshaft. The angular velocity is a measure of the speed n of the internal combustion engine 10.

It is also now readily apparent in view of the foregoing that multiple further sensors may be provided in modern motor vehicles for controlling and/or regulating the internal combustion engine 10, which sensors detect pressures, temperatures, angular positions of camshafts, and/or further operating parameters of the internal combustion engine 10. The present invention is therefore not restricted to use in an internal combustion engine 10 which only has the sensors 28, 30, 44, 48 specified up to this point. Thus, in one embodiment, the electrical drive 43 may provide information I_TSQ about an actual value of the turbine flow cross-section TSQ, such as an actual value of a set blade position, for regulating the blade position in a closed loop or a self-diagnostic result.

To control the internal combustion engine 10, the signals of the integrated throttle valve sensor 28, the charge sensor 30, the driver command meter 44, the boost pressure sensor 10, the rotational angle sensor 48, the optionally provided information I_TSQ, and possibly the signals of alternative or further sensors are processed by an engine control unit 52 that is set up, particularly programmed, to control the sequence of the method according to the present invention and/or one or more of its embodiments.

The control unit 52 is distinguished in particular in that it produces actuating signals for controlling functions of the internal combustion engine 10 from the information and signals received. In the embodiment of FIG. 1, these are essentially throttle valve actuating signals S_DK and signals S_TSQ, by which the control unit 52 controls a turbine flow cross-section TSQ, as well as injection pulse widths ti and ignition signals.

Figure 2:
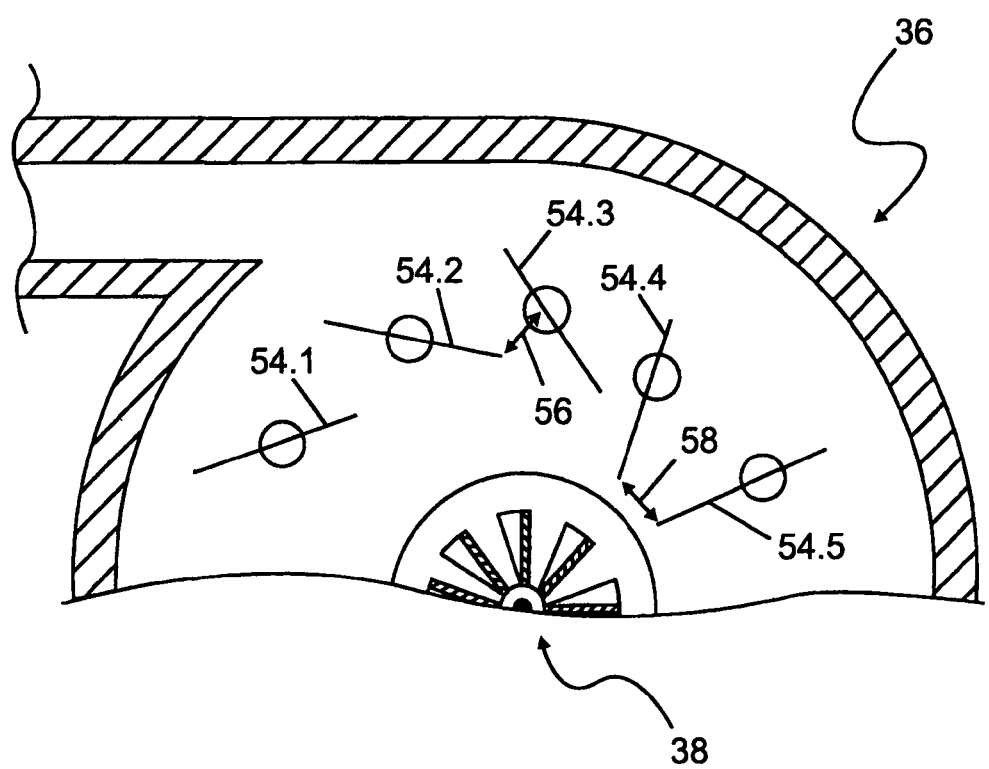
FIG. 2 is a schematic illustration of the variability of the turbine geometry.

FIG. 2 shows an embodiment of a turbine of a turbocharger 36 having annularly situated blades 54.1, 54.2, 54.3, 54.4, and 54.5. Notwithstanding a realistic depiction, in which all blades 54.1, 54.2, 54.3, 54.4, and 54.5 are set identically, the blades 54.1, 54.2, and 54.3 are shown in a closed position having a smaller flow cross-section 56, and the blades 54.4 and 54.5 are shown in a further open position having a larger flow cross-section 58. The base boost pressure is represented using the larger flow cross-section 58 in this case. The adjustment is performed by the actuator 42 that actuates an adjustment ring connected to the blades via, for example, movable levers. Details of the mechanism are not essential for a full understanding of the present invention by one of ordinary skill.

Figure 3:
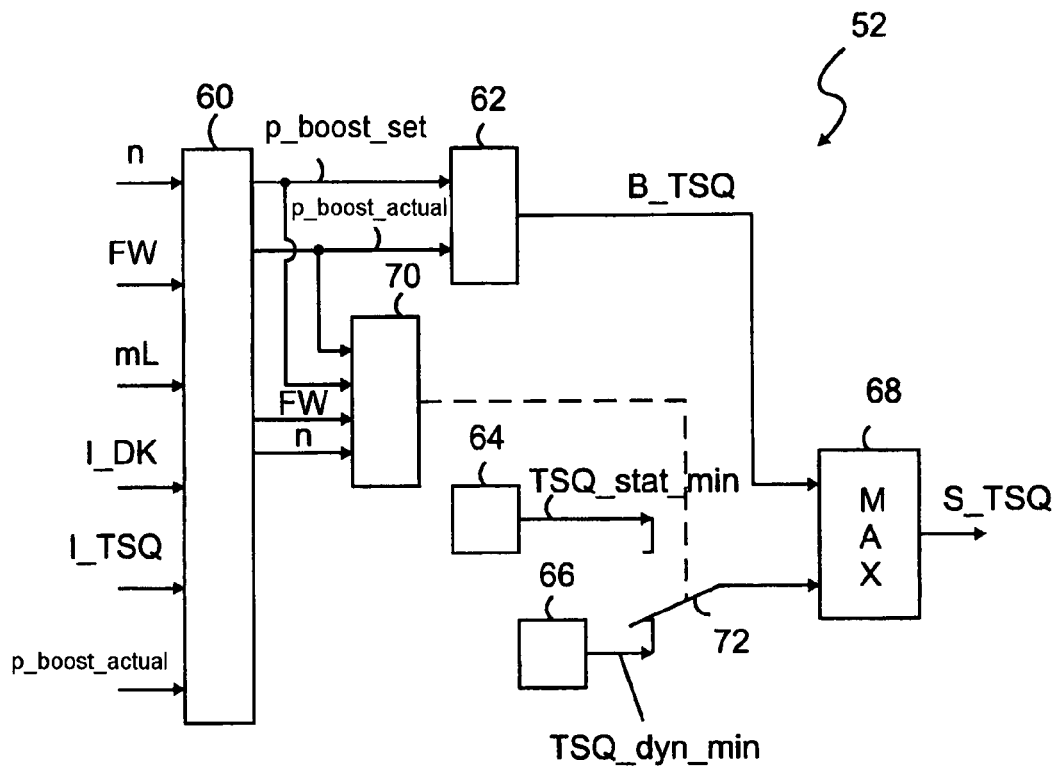
FIG. 3 is a schematic function block illustration of the method and device features of an embodiment of the present invention.

FIG. 3 shows an exemplary embodiment of a control unit 52 according to the present invention in a schematic function block illustration. Various functions of the control unit 52 that are important for controlling the internal combustion engine 10, but are less important for understanding the present invention, are combined in a block 60. The block 60 processes the signals of the sensors cited in connection with FIG. 1 and calculates manipulated variables for activating the actuator illustrated in FIG. 1 with the exception of the electrical actuator 43 for the turbocharger 36. The block 60 thus calculates, inter alia, injection pulse widths ti for activating injectors 32 and a throttle valve actuating signal S_DK.

Furthermore, a setpoint value p_boost_set for regulating the charge pressure of the turbocharger 36 is also generated inside the control unit 52. In FIG. 3, this setpoint value is also generated in block 60 as a function of one or more input signals. The setpoint value is typically a function of the driver command, the combustion chamber charge, and the speed. A boost pressure regulator 62 processes the setpoint value p_boost_set and an actual value p_boost_act provided by the block 60 to form a base value B_TSQ for the turbine flow cross-section TSQ to be set.

The blocks 64, 66, 68, and 70 are used to limit the regulator intervention and thus prevent the occurrence of a disadvantageously large scavenging gradient as a result of a too strongly constricted turbine flow cross-section. Each of the blocks 64 and 66 output a lower limit of a range of settable values of the turbine flow cross-section. The block 64 provides a lower limit TSQ_stat_min for stationary operating states, and the block 66 provides a lower limit TSQ_dyn_min for dynamic, i.e., non-stationary operating states. The lower limit TSQ_dyn_min is determined by block 66 as a function of the speed n as an operating parameter of the internal combustion engine 10 according to a predetermined relationship. The relationship is particularly predetermined such a way that setting the turbine flow cross-section to the value TSQ_dyn_min does not yet result in a disadvantageously large scavenging gradient.

Viewed purely qualitatively, the minimum allowed turbine flow cross-section will be smaller at low speeds than at high speeds. If the lower limit is additionally determined as a function of load, it will be smaller at small loads than at large loads. Any measure calculated in control unit 52 for an injected fuel quantity or a combustion chamber charge with air or fuel/air mixture comes into consideration as an operating parameter that is a function of load or varies with load. In any case, however, the dependence is predetermined so that a scavenging gradient of the internal combustion engine does not exceed a predetermined maximum value.

The lower limit TSQ_stat_min for stationary operating states may be constant or may also be a function of one or more operating parameters of the internal combustion engine 10.

The block 70 is used for differentiating stationary and non-stationary states. In stationary states, block 70 connects the block 64 via the switch 72 to the block 68, and in non-stationary states, it connects the block 66 to the block 68. Therefore, a base value B_TSQ and a lower limit TSQ_dyn_min are applied to the block 68 in non-stationary states. The block 68 selects the maximum of these simultaneously applied values and outputs the maximum or a signal assigned to the maximum as an actuating signal S_TSQ for activating the electrical actuator 43.

In other words; when the regulator 62 outputs a base value B_TSQ that would result, in the non-stationary case, in a cross-section that would be smaller than the predefined lower limit TSQ_dyn_min, instead the larger cross-section TSQ_dyn_min is set. In contrast, if the regulator 62 outputs a base value B_TSQ that would result in a larger cross-section, this cross-section is set.

To differentiate stationary and non-stationary operating states, in one embodiment the block 70 monitors the driver command and/or the boost pressure setpoint value and/or the boost pressure actual value and/or the speed for changes and evaluates an operating state as non-stationary if a change velocity of at least one of the monitored values exceeds a predefined first threshold value. If a threshold value is exceeded, block 70 connects the block 66 to the block 68. An end of the non-stationary operating state is accordingly recognized in one embodiment when the value falls below a second threshold value. Further contemplated embodiments differ in that the first threshold value and the second threshold value are either identical or different. In the event of different threshold values, the second threshold value is preferably smaller, in order to produce a hysteresis. In the scope of a further alternative, the switch 72 is changed over in a time-controlled way, so that switching state characterizing non-stationary operating states is limited in its duration.

Figure 4:
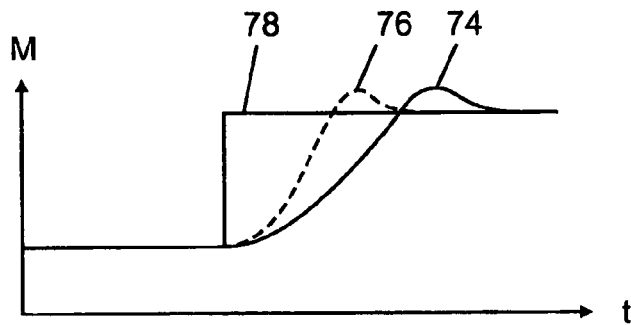
FIG. 4 is a graph comparing time curves of a boost pressure setpoint value and a boost pressure actual value between the present invention and in the prior art.

As a whole, the occurrence of scavenging gradients whose absolute value is disadvantageously large is avoided by the method presented here. By limiting the turbine flow cross-section in non-stationary operating states as a function of the speed with consideration of the scavenging gradient, a more rapid boost pressure and torque increase than in the prior art is achieved. FIG. 4 illustrates this effect by a comparison of a torque increase 74 using typical adjustment of the blades and a torque increase 76 using limiting of the adjustment of the blades according to the present invention during a stepped increase of the setpoint torque 78 in arbitrary units over the time t.

In internal combustion engines with multiple turbochargers with adjustable turbine geometry, the above-described method and/or one or more of its embodiments can be applied correspondingly for all turbochargers. The method described may also be used in principle in gasoline engines and diesel engines. If, however, the method is used in gasoline engines, the advantages are more strongly pronounced because, in contrast to the diesel engine that is typically operated unthrottled, gasoline engines are operated throttled in the part-load range.

The diesel engine operates in part load using excess air. The desired torque is set via the metered fuel quantity, i.e., via the quality of the combustion chamber charge in the event of essentially identical combustion chamber charge. As a result, the diesel engine delivers a comparatively large exhaust gas mass flow that keeps the turbine at speed and permanently generates a comparatively high boost pressure, even in the part-load range, in which only little torque is generated. A closing activation of the blade adjustment then results practically without delay in increased turbine output, increased boost pressure, and thus a rapid rise of the combustion chamber charges and the torque of the diesel engine.

In contrast, the gasoline engine power is set via the quantity of the mixture combusted in the combustion chamber. At low power, i.e., at low torques and/or speeds, only a correspondingly smaller exhaust gas mass flow also results. In operating states having low exhaust gas mass flows, the turbine speed thus drops comparatively strongly. The turbocharger must therefore be accelerated out of lower speeds in the gasoline engine. Accordingly, it reacts more sensitively to a disadvantageously large scavenging gradient. The advantageous effects of avoiding the disadvantageously large scavenging gradient are, however, also more pronounced in the gasoline engine.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method for setting an internal combustion engine turbocharger turbine flow cross-section, which comprises the step of:
    predetermining a function of a gasoline powered internal combustion engine speed operating parameter so that an internal combustion engine scavenging gradient does not exceed a predetermined maximum value;
    detecting the gasoline powered internal combustion engine speed operating parameter;
    determining a lower limit of a range of settable values of the turbine flow cross-section as the function of the gasoline powered internal combustion engine speed operating parameter in non-stationary internal combustion engine operating states; and
    adjusting an actuator of a turbine geometry for setting an internal combustion engine turbocharger turbine flow cross section for optimizing a torque increase.

2. The method according to claim 1, wherein the lower limit is additionally determined as a function of another internal combustion engine operating parameter that varies with internal combustion engine load.

3. The method according to claim 2, wherein the another internal combustion engine operating parameter is a measure of an injected fuel quantity or a combustion chamber charge with air or a fuel/air mixture.

4. The method according to claim 1, wherein a base value for the turbine flow cross-section to be set is calculated by a boost pressure regulator and an actual turbine flow cross-section to be set is determined by a selection of the maximum of the base value and the lower limit.

5. The method according to claim 4, wherein the lower limit is additionally determined as a function of another internal combustion engine operating parameter that varies with internal combustion load.

6. The method according to claim 5, wherein the another internal combustion engine operating parameter is a measure of an injected fuel quantity or a combustion chamber charge with air or a fuel/air mixture.

7. The method according to claim 1, wherein at least one of a driver command, a boost pressure setpoint value, a boost pressure actual value and the internal combustion engine speed are monitored for changes and an operating state is considered non-stationary when a change velocity of at least one of the monitored values exceeds a predefined threshold value.

8. The method according to claim 7, wherein the lower limit is additionally determined as a function of another internal combustion engine operating parameter that varies with internal combustion engine load.

9. The method according to claim 8, wherein the another internal combustion engine operating parameter is a measure of an injected fuel quantity or a combustion chamber charge with air or a fuel/air mixture.

10. The method according to claim 7, wherein a base value for the turbine flow cross-section to be set is calculated by a boost pressure regulator and an actual turbine flow cross-section to be set is determined by a selection of the maximum of the base value and the lower limit.

* * * * *